July 27, 1926.
H. C. KNOWLES
ROLLER BEARING
Filed May 13, 1920
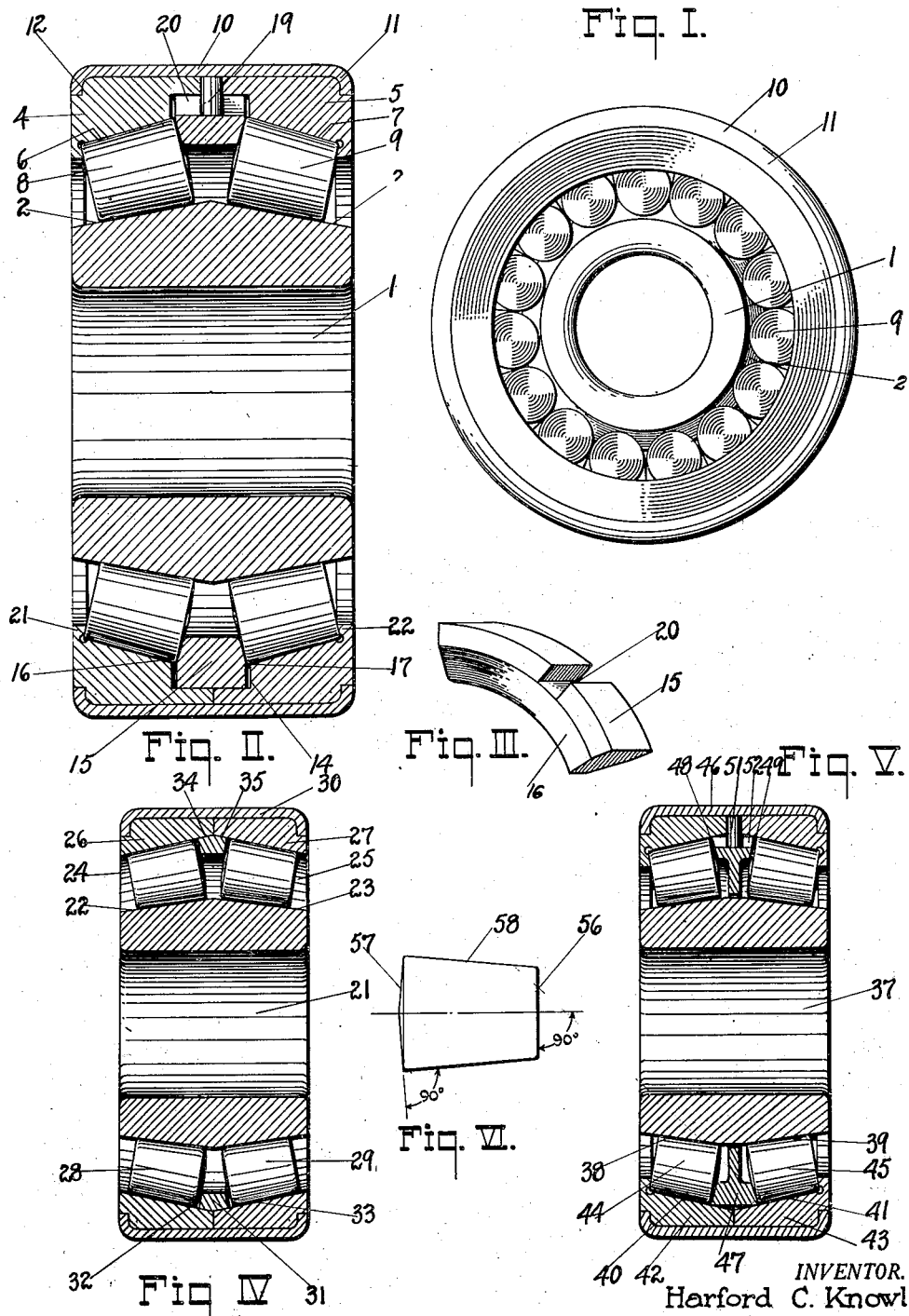
INVENTOR.
Harford C. Knowles.
BY Chester W. Braselton
Harry W. Lindsey Jr.
ATTORNEYS Patented July 27, 1926.

1,593,580

UNITED STATES PATENT OFFICE.

HARFORD C. KNOWLES, OF ELMIRA, NEW YORK, ASSIGNOR TO THE WILLYS-MORROW COMPANY, OF ELMIRA, NEW YORK, A CORPORATION OF OHIO.

ROLLER BEARING.

Application filed May 13, 1920. Serial No. 381,051.

This invention relates to improvements in roller bearings, and particularly that type of roller bearings in which tapered rollers are employed for the purpose of reducing the friction and taking up end thrust.

One object of the invention is to provide an improved bearing of this character wherein end thrusts upon the bearing are distributed between the bearing surfaces in such a manner as to prevent wedging of the tapered rollers between the bearing surfaces.

Another object of the invention is to provide suitable means in a bearing of this character for equalizing the thrust between the two sets of rollers and at the same time distributing the thrust load impressed upon the bearing in a proper manner between the two sets of rollers.

A further object of the invention is to decrease the frictional resistance by forming the tapered rollers so that the larger ends have a rolling contact with the thrust ring and thus eliminating friction due to the ends of the rollers sliding upon the ring.

Other objects of the invention relate to economies of manufacture and details of construction as will hereinafter appear from the detailed description to follow.

The objects of the invention are accomplished in one instance by the means described in the following specification, but it is to be understood that the same may be varied considerably without departing from the scope of the invention as pointed out in the appended claims.

A structure constituting one embodiment of the invention is illustrated in the accompanying drawings forming a part hereof, in which:

Figure I is a side elevational view of the complete bearing, illustrating the position of the various parts with respect to each other.

Figure II is a transverse sectional view through the bearing illustrating the position of the spacing ring relative to the two sets of rollers.

Figure III is a detail perspective view showing a portion of the spacing.

Figure IV is a transverse sectional view illustrating a modified form of bearing.

Figure V is a transverse sectional view illustrating a further modified form of bearing.

Figure VI is a side elevation of one of the tapered rollers illustrating the formation of the end portions thereof.

The bearing forming the subject matter of this application is an improvement upon that shown in my application, Serial Number 381,052 filed May 13, 1920.

The forms of tapered roller bearings heretofore employed fail to operate properly under a combined radial and thrust load by reason of the fact that roller bearings designed for taking a radial load are so constructed as to cause a wedging of the rollers between the bearing surfaces when a thrust load is applied. In the form of bearing illustrated herewith a full type double roller bearing is illustrated which is constructed so as to operate properly under a radial load and also operate satisfactorily when a thrust load is placed thereon by reason of the fact that the parts are so arranged as to distribute the load properly between the bearing surfaces and eliminate the wedging and binding action of the rollers between the bearing surfaces ordinarily occasioned when a thrust load is impressed upon the usual form of tapered roller bearings.

In the embodiment of the invention illustrated herewith, 1 designates a unitary inner bearing member which is provided upon its outer surface with a pair of outwardly sloping bearing surfaces 2 and 3 adapted to extend outwardly in a direction longitudinally of the bearing from a point substantially coincident with the transverse center line of the bearing. A pair of similarly constructed outer bearing members 4 and 5 are employed which are provided with conical bearing surfaces 6 and 7 respectively so positioned as to form together with the sloping bearing surfaces 2 and 3 raceways for the reception of the sets of tapered rollers 8 and 9. The outer bearing members 4 and 5 are adapted to be so positioned that the inner edges thereof are in close contact and these bearings are suitably held in position relative to each other by means of a cylindrical shell 10, the outer edge portions of which are bent inwardly at 11 so as to fit within suitable annular grooves 12 formed upon the outer edges of the bearing members whereby the outer bearing members are firmly secured in position relative to each other. A portion of the inner edges of each outer bearing member is cut away as indicated at 14 to provide an annular recess for the reception of a ring 15 which is adapted to be positioned therein and have a portion extending inwardly between the adjacent ends of the two sets of tapered rollers. That portion of the ring which extends inwardly between the two sets of tapered rollers is provided with beveled faces 16 and 17 against which the conical inner ends of the tapered rollers are adapted to bear, the ring extending inwardly such a distance that the conical ends of the tapered rollers bear there against at points radially outward of the axis of each roller. The recesses 14 formed in the inner edges of the outer bearing members are formed in such a way as to provide an annular groove for the reception of the ring which groove is of somewhat greater width than the width of the ring whereby a certain amount of longitudinal movement on the part of the ring relative to the bearing is permitted when end thrust is applied to the bearing. By reason of the movement which the ring can have in a direction longitudinally of the bearing the end thrust applied to the bearing is capable of being more equally distributed between the two sets of rollers and thus the wedging of the rollers between the inclined bearing surfaces is largely eliminated. A radially positioned pin 19 is carried by the outer bearing members and projects inwardly radially therefrom the inner end portion of said pin being positioned within a transverse slot 20 formed in the outer surface of the ring whereby the ring is held against rotative movement relative to the outer bearing members while longitudinal movement of the ring relative to the outer bearing members is permitted.

In the embodiment of invention illustrated in Figure II of the drawings, the outer bearing members 4 and 5 are provided with inwardly projecting annular shoulders 21 and 22 respectively which extend inwardly from the outer edge of the outer bearing members adjacent to the other ends of the two sets of tapered rollers. It is to be understood, however, that the provision of these inwardly extending annular shoulders upon the outer edges of the outer bearing members is not absolutely essential to the operation of the bearing and these inwardly extending shoulders may be dispensed with if desired.

In the modification of the invention illustrated in Figure IV of the drawings, the inner bearing member 21 is similar in all respects to the inner bearing member above described and is provided with similar outwardly inclined bearing surfaces 22 and 23 adapted to cooperate with the inclined bearing surfaces 24 and 25 formed upon the other bearing members 26 and 27 respectively to provide raceways for the two sets of tapered rollers 28 and 29. An annular sleeve 30, similar in all respects to the sleeve 10 of the form illustrated in Figure II of the drawings, is provided for properly retaining the outer bearing members in position relative to each other and to the remaining portion of the bearing. In this form of bearing a ring 31 is provided which is adapted to be positioned between the ends of the two sets of tapered rollers, the ring 31 being provided with beveled faces 32 and 33 formed upon the side edges thereof and inclined at a proper angle for bearing against the conical ends of the tapered rollers radially outward of the axis of each roller. The ring 31 is provided upon its outer face with a pair of oppositely inclined surfaces 34 and 35 which are adapted to engage with the inclined inner faces of the outer bearing members when the ring is in position within the bearing. The outer inclined surfaces of the ring are thus gripped by the outer bearing members and the ring is held in assembled position centrally of the bearing, and retained against rotative movement relative to the inner bearing member.

In the form illustrated in Figure V of the drawings, an inner bearing member 37 similar in all respects to the inner bearing member disclosed in the other modified forms is provided upon its outer surface with a pair of oppositely inclined bearing surfaces 38 and 39 adapted to cooperate with similar inclined bearing surfaces 40 and 41 upon the outer bearing members 42 and 43 respectively to provide raceways for the sets of tapered rollers 44 and 45. The outer bearing members 42 and 43 are similar to the outer bearing members previously described and are held in position relative to each other by means of an annular sleeve 46 in the manner described in connection with the other forms of the bearing. A ring 47 is positioned between the adjacent ends of the tapered rollers and is so proportioned as to provide a slight clearance space between the inner and outer surfaces thereof and the inner and outer bearings respectively. The ring 47 is provided with beveled faces 48 and 49 formed upon opposite sides thereof against which the inner ends of the tapered rollers are adapted to bear at points outwardly of the axes of said rollers. A pin 51 is retained in position by the outer bearing member and has a portion projecting radially inwardly and positioned within a transverse slot 52 formed in the outer surface of the ring whereby the ring is maintained against rotation relative to the outer bearing members. By reason of the slot 52 formed in the outer surface of the ring and the slight clearance between the inner and outer surfaces of the ring and the inner and outer bearing members respectively the ring is capable of slight longitudinal movement relative to the bearing while being prevented from rotation relative to the outer bearing members.

In each of the forms illustrated the tapered rollers are each provided with a plane surface 56 at the smaller end thereof, this plane surface making an angle of 90° with the axis of the roller and a conical surface 57 at the larger end of the roller the conical surface making an angle of 90° with the bearing surface 58 of the roller. The beveled faces of the rings 15, 31 or 47 are formed at such an angle as to contact throughout their radial extent with the conical surfaces of the tapered rollers thus insuring a rolling contact between the tapered end of the rollers and preventing slipping of the rollers relative to the ring.

It will be understood from the above description that the various forms of bearing illustrated herewith are all of the double row full roller type, and are so constructed as to enable end thrusts to be distributed between the two rows of anti-friction members whereby wedging or binding of the tapered rollers within the bearing is eliminated. It will be seen upon inspection of the drawings that if end thrust is applied to the inner bearing member in such a manner as to force the inner bearing member towards the right as seen in Figures II, IV and V of the drawing, the result will be to place additional load upon the set of rollers at the right in those figures whereupon the tendency of the rollers being pressed between the cooperating bearing surfaces will be to move toward the larger ends of the rollers, or inwardly toward the center of the bearing whereupon the set of rollers at the right in Figures II, IV and V will engage the ring positioned within the outer bearing members along a line radially outward of the line of the axes of the rollers thus forcing the ring positioned between the rollers in the opposite direction or towards the left as seen in Figures II, IV and V of the drawings whereupon the ring forced towards the left will engage the left hand row of tapered rollers shown in these figures and tend to equalize the pressure exerted upon the bearing and prevent binding of the tapered rollers between the bearing surfaces. It will be noted that in none of the forms illustrated herewith are the inner bearing members provided with a shoulder located adjacent the larger ends of the tapered rollers as is common in the usual construction of tapered roller bearings and which if present would prevent a proper equalization of the thrust exerted upon the bearings, but would on the contrary tend to force the rollers bodily in the direction of the thrust and thereby increase the binding or wedging action of the rollers between the bearing surfaces. Thus the set of rollers at the right in Figures II, IV and V will not be pressed into wedging engagement with the inner and outer bearing surfaces, but the thrust exerted upon the inner bearing member will be distributed between the inner and outer bearing members and also by reason of the ring positioned between the two sets of rollers a portion of this thrust will be transmitted to the other set of rollers. The thrust upon the bearing is taken up on the bearing surfaces of the rollers instead of directly upon the ends of the rollers whereby the proportionate degree of thrust which may be applied to the bearings is greatly increased over that which may be applied to a bearing in which the thrust is transmitted directly to the end of the rollers. As the thrust is in the direction of the smaller ends of the rollers and as increased pressure on the rollers tends to cause them to move in the opposite direction or towards their larger ends the two forces thus tend to equalize each other and prevent wedging of the rollers as would result if the thrust was impressed directly upon the larger ends of the rollers.

While I have shown and described in considerable detail a certain specific embodiment of my invention, it is to be understood that this showing and description is illustrative only and for the purpose of rendering my invention more clear, and that I do not regard the invention as limited to the precise details of construction illustrated or described except in so far as I have included such limitations within the terms of the following claims, in which it is my intention to claim all novelty inherent in my invention broadly as well as specifically.

What I claim as new and desire to secure by Letters Patent is:

1. In a roller bearing, the combination with inner and outer bearing members and two sets of rollers interposed therebetween, of a ring non-rotatably supported by the outer bearing member and located between the adjacent ends of the rollers, the said ring being capable of slight movement in a direction longitudinally of the bearing and adapted for rolling engagement with the peripheral portions of the adjacent ends of the rollers.

2. In a roller bearing, an inner bearing member having conical bearing surfaces converging outwardly from the transverse central line of the bearing, outer bearing members provided with inner bearing surfaces adapted to cooperate with the outer bearing surfaces of the inner bearing member, two sets of tapered rollers interposed between the inner and outer bearing members, and a ring non-rotatably supported by one of said bearing members and interposed between the adjacent ends of the rollers of the two sets, said ring being capable of limited movement longitudinally of the bearing.

3. In a roller bearing, the combination with inner and outer bearing members and two sets of rollers interposed therebetween, of a ring having bevelled sides non-rotatably supported by the outer bearing and located between the adjacent ends of the two sets of rollers for engagement with the inner ends of the rollers outwardly of the axis of each roller.

4. In a roller bearing, the combination with inner and outer bearing members and two sets of tapered rollers interposed therebetween, of a ring located between the adjacent ends of the two sets of rollers and non-rotatable with respect to the outer bearing member; said ring having beveled side faces with which the rollers engage outwardly of the axis of each roller and being capable of a limited axial movement.

5. In a roller bearing, the combination with inner and outer bearing members and two sets of tapered rollers interposed therebetween, of a ring located between the adjacent ends of the two sets of rollers with which the ends of the rollers are adapted to engage to equalize end thrusts between the bearing surfaces, and means for preventing rotation of the ring relative to the outer bearing member.

6. In a roller bearing, the combination with inner and outer bearing members and two sets of tapered rollers interposed therebetween, of a ring located between the adjacent ends of the two sets of rollers and provided with a transverse slot in the outer face thereof, and a pin supported by the outer bearing member engaging with said slot to prevent rotation of the ring relative to the outer bearing member.

7. In a roller bearing, the combination with inner and outer bearing members and two sets of rollers interposed therebetween said rollers having conical inner ends, of a ring non-rotatably supported by one of said bearing members and located between the conical ends of the said rollers and having beveled faces for engaging and making rolling contact with said conical ends.

8. In a roller bearing, the combination with inner and outer bearing members and two sets of rollers interposed therebetween the adjacent ends of said rollers being conical, of a ring non-rotatably supported by one of said bearing members and located between said conical ends and having beveled faces for making rolling contact therewith, said ring being capable of limited movement longitudinally of the bearing.

9. A roller bearing comprising an inner bearing member having two oppositely inclined conical raceways, an outer bearing member having two correspondingly inclined conical raceways, two sets of tapered rollers between said raceways, a ring carried by one of said bearing members and non-rotatable with respect thereto to have rolling contact with the peripheral portions of adjacent end faces of said rollers, said ring and said rollers having a limited axial movement whereby end thrust on said bearing is substantially equalized between said two sets of rollers.

In testimony whereof, I affix my signature.

HARFORD C. KNOWLES.